US011115538B2

(12) United States Patent
Moran

(10) Patent No.: US 11,115,538 B2
(45) Date of Patent: *Sep. 7, 2021

(54) AGENT EFFICIENCY BASED ON REAL-TIME DESKTOP ANALYTICS

(71) Applicant: Avaya Inc., Santa Clara, CA (US)

(72) Inventor: Thomas Moran, Galway City (IE)

(73) Assignee: Avaya Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/837,657

(22) Filed: Apr. 1, 2020

(65) Prior Publication Data

US 2020/0228659 A1    Jul. 16, 2020

Related U.S. Application Data

(63) Continuation of application No. 15/903,759, filed on Feb. 23, 2018, now Pat. No. 10,659,612.

(51) Int. Cl.
*H04M 3/00* (2006.01)
*H04M 3/523* (2006.01)
*H04L 12/24* (2006.01)
*H04M 3/51* (2006.01)

(52) U.S. Cl.
CPC .......... *H04M 3/5233* (2013.01); *H04L 41/04* (2013.01); *H04M 3/5175* (2013.01)

(58) Field of Classification Search
USPC ....... 379/265.01–265.14, 266.01–266.1, 309
See application file for complete search history.

(56) References Cited

U.S. PATENT DOCUMENTS

| 7,376,227 | B2 | 5/2008 | Anisimov et al. |
| 8,976,955 | B2 | 3/2015 | Liberman Ben-Ami et al. |
| 10,659,612 | B2 | 5/2020 | Moran |
| 2007/0041567 | A1 | 2/2007 | Anisimov et al. |
| 2011/0171939 | A1 | 7/2011 | Deliwala et al. |

OTHER PUBLICATIONS

Official Action for U.S. Appl. No. 15/903,759, dated Mar. 13, 2019, 6 pages.
Final Action for U.S. Appl. No. 15/903,759, dated Sep. 5, 2019, 5 pages.
Notice of Allowance for U.S. Appl. No. 15/903,759, dated Jan. 10, 2020 5 pages.

*Primary Examiner* — William J Deane, Jr.
(74) *Attorney, Agent, or Firm* — Sheridan Ross P.C.

(57) ABSTRACT

A contact center includes: a microprocessor; a computer readable medium, coupled to the microprocessor, to retrieve, store, and manage desktop analytic data that describes the current state of an agent's desktop. The current state of the agent's desktop can be reported to a contact center where that information can be used as additional information in assigning contacts to the agent. The contact may be sent to the agent having documentation or information readily accessible to response to the issue associated with the contact.

20 Claims, 15 Drawing Sheets

AGENT EFFICIENCY BASED ON REAL-TIME DESKTOP ANALYTICS

CROSS REFERENCE TO RELATED APPLICATION

The present application is a continuation of U.S. patent application Ser. No. 15/903,759, filed Feb. 23, 2018 entitled "AGENT EFFICIENCY BASED ON REAL-TIME DESKTOP ANALYTICS", which is incorporated herein by this reference in its entirety.

FIELD OF INVENTION

The systems and methods disclosed herein relate to contact centers and in particular to managing metrics in contact centers.

BACKGROUND

Today, a large number of contact centers maintain a contact center control room where there are multiple people responsible for monitoring the overall health and activity of one or more contact centers. The contact center control room normally has responsibility to route calls or contacts to contact agents or their managers to respond to customer requests, customer complaints, etc.

Often, the contact centers control room focuses on monitoring an agent skill level and/or a Vector Directory Number (VDN) level. These metrics are typically referred to as contact center metrics. For example, a contact center may have 1437 agent skills and 2058 VDNs on one automatic call distributor (ACD). These call center metrics are typical and well within the limitations of current call management systems (CMS), which may be able to handle 8,000 skills per ACD and 30,000 VDNs per ACD. It is not humanly possible for a small set of people to actively watch and monitor that many skills and VDNs at the same time.

The contact center can automatically route calls. Generally, the call or contact is reviewed to determine what is needed by the customer. This information is then matched to a skill or skills associated with one or more agents. The best match between the skills and the customer needs determines which agent will receive the contact. However, there can still be some information that could make the resolution of the contact more efficient that is not considered by the contact center.

DETAILED DESCRIPTION

Figure 1:
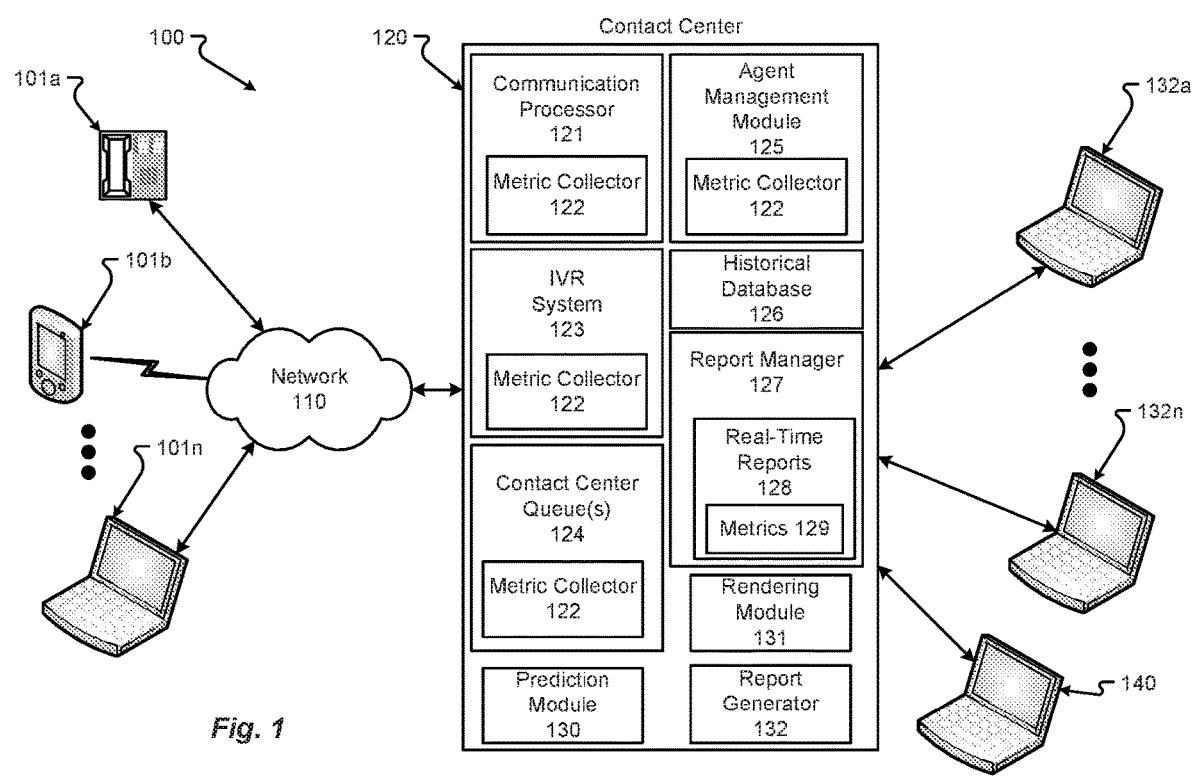
FIG. 1 is a block diagram of an environment including a contact center in accordance with the one or more embodiments presented herein.

Embodiments of the present disclosure will be described in connection with a contact center. Methods and systems herein can retrieve, store, and manage desktop analytic data that describes the current state of an agent's desktop. The current state of the agent's desktop can be reported to the contact center where that information can be used as additional information in assigning contacts to the agent.

In many contact center environments agents need to access significant amounts of information using multiple computer applications to provide the required customer service. Accessing specific information takes time and thus has a negative impact on agent productivity. The embodiments herein improve agent productivity by acknowledging that accessing the information on the agent desktop does take time.

Desktop Analytics (DA) applications provide intelligence about how agents use computer applications and knowledge base systems to perform their work. When deployed on an agent's desktop, DA enable a detailed insight into what information is being accessed including which applications (and the specific locations, within these applications), the web links accessed, documents opened, etc. Thus, DA can provide a complete and detailed perspective of everything an agent is doing on their desktop computer at a point in time.

DA is currently used in many contact centers to collect metrics from the agent's desktop and to identify potential performance improvements that can be achieved either by optimizing the agent's desktop applications or possibly by providing additional training for the agent. The embodiments herein leverage Desktop Analytics to improve agent efficiency by using the DA output, in real-time, to optimize the routing of contacts.

There are many customer care scenarios where an agent may need to access a significant amount of information and to access multiple applications to adequately deal with a specific customer request. A customer request may be of a technical nature, and the agent may need to conduct a search of a large documentation knowledge base to find the relevant documentation. As part of this same request, the agent may also need to access multiple desktop applications and other resources. In at least some multimedia contact centers, an agent may process or address multiple contacts at the same time (e.g., several chat sessions or emails) and so the number of applications and documents that are simultaneously active increases. Agents may also have multiple screens at their disposal thus enabling the agent to increase their level of multitasking even more.

Using the DA software, real-time information, about what documentation or resources the agent is currently using, is provided to the contact center routing engine. These resources and the information about the resources can describe which applications, documents, web pages etc. the agent is currently using. The routing engine of the contact center can then use the resource information about the agent desktop to influence routing decisions for contacts that are currently still in the queue. For example, if there are a number of agents with the same skill level and the same capacity to handle a particular incoming chat session, the routing engine can route a contact to a specific agent who currently has the relevant applications or documents already open on their desktop. This change in the routing decision means that the agent is more efficient in their handling of this particular chat session because everything the agent needs, from a desktop resource perspective, is already open and instantly available to them. Additionally, the agent is likely more familiar with the actual subject matter or content of the documentation or resources because the agent is already using the resources for a similar, active contact.

From an implementation perspective, the DA software creates an additional set of dynamic attributes that describe the agent's desktop status, in real-time, and provides that information back into the routing software. This agent desktop information can be continuously provided to the routing engine, in real-time, and can be used as an additional factor in the routing decision.

The advantages of this change in the routing decision is more pronounced in a multimedia environment because an agent may be processing many incoming contacts at the same time. Hence, contacts that require the same or similar desktop resources may be grouped and routed to a specific agent who can process them in parallel. The use of the DA analytics in the routing decision can reduce the average service time for contacts, increases the capacity of a given agent workforce size, and, ultimately, saves money for the company who implements this type of functionality.

FIG. 1 is a block diagram of a first illustrative system 100 for managing contacts and contact center metrics 129. The first illustrative system 100 comprises communication endpoints 101*a*-101*n*, a network 110, a contact center 120, agent terminals 132*a*-132*n*, and an administrative terminal 140.

The communication endpoint 101 can be or may include any device that can communicate on the network 110, such as a Personal Computer (PC), a telephone, a video system, a cellular telephone, a Personal Digital Assistant (PDA), a tablet device, a notebook device, a smart phone, and the like. As shown in FIG. 1, any number of communication endpoints 101*a*-101*n* may be connected to the network 110, including only a single communication endpoint 101. The communication endpoints 101*a*-101*n* are used by customers to initiate/receive communications to and from the contact center 120.

The network 110 can be or may include any collection of communication equipment that can send and receive electronic communications, such as the Internet, a Wide Area Network (WAN), a Local Area Network (LAN), a Voice over IP Network (VoIP), the Public Switched Telephone Network (PSTN), a packet switched network, a circuit switched network, a cellular network, a combination of these, and the like. The network 110 can use a variety of electronic protocols, such as Ethernet, Internet Protocol (IP), Session Initiation Protocol (SIP), Integrated Services Digital Network (ISDN), video protocols, email protocols, Instant Messaging (IM) protocols, and the like. Thus, the network 110 is an electronic communication network or computer network configured to carry messages via packets and/or circuit switched communications.

The contact center 120 can be or may include any hardware, which when coupled with software/firmware, that can be used for routing and management of electronic communications to contact center agents, such as an automatic call distributor (ACD) system, a call router, a communication manager, and/or the like. The contact center 120 can handle various types of communication, such as voice communications, video communications, email communications, text communications, IM communications, and/or the like.

The contact center 120 further comprises a communication processor 121, an Interactive Voice Response (IVR) system 123, contact center queue(s) 124, an agent management module 125, a historical database 126, a report manager 127, a prediction module 130, a rendering module 131, and a report generator 132. The contact center 120 is shown as a single element. However, at least in some configurations, the contact center 120 may have various elements (elements 121-132) distributed within the network 110.

The communication processor 121 can be any hardware and/or software that can route communications, such as an ACD system, a router, a Private Branch Exchange (PBX), a switch, a communication manager, a session manager, an email system, an IM system, and/or the like. The communication processor 121 can manage/route communications, such as voice communications, video communications, email communications, text communications, IM communications, and/or the like.

The communication processor 121 can include a metric collector 122. The metric collector 122 can collect real-time contact center metrics 129 for the contact center 120. The metric collector 122, in the communication processor 121, collects contact center metrics 129 associated with the communication processor 121.

A contact center metric 129 can be or may include any information tracked by the contact center 120, such as, vector directory numbers (VDNs), an agent skill(s) (e.g., a specific type product a contact center agent can support), a skill group (e.g., a number of contact center agents assigned to support a specific product or service), a total number of available trunks, a total number of call work codes, a total number of vectors, a number of incoming calls, a number of call drops, a number of call hang-ups, a number of call routes, a number of out-going calls, a number of incoming or outgoing emails, a number of current, incoming, or outgoing Instant Messaging sessions, a number of outgoing calls, a number of received text messages, a number of sent text messages, a number of received video calls, a contact center queue level, a number of work items, a number of IVR responses, and/or the like.

The contact center metrics 129 can form multiple data element sets. Each data element set typically includes activities of different contact center objects that can be monitored, either historically or substantially in real-time, to produce corresponding contact center metrics 129. Exemplary contact center objects include, without limitation, contact center agents, splits, Vector Directory Numbers ("VDNs"), work items (e.g., inbound or outbound communications with third party customers), and vectors. The data element sets typically have the same types of data elements (e.g., data elements having a common class label) and are comparable or have matching, or identical, numbers and types of data elements.

For example, a first data element set comprises multiple data elements in the form of a first type of contact center metric corresponding to a first contact center object and a second data element set comprises multiple data elements in the form of a second type of contact center metric corresponding to a different second contact center object. The first and second data element sets have the same number and the first and second contact center objects are the same types of contact center objects, e.g., the first and second contact center objects are different contact center agents, splits, VDNs, vectors, and the like.

The Interactive Voice Response (IVR) system 123 is an interactive voice/video response system that allows interaction with a caller. For example, the IVR 123 may provide a menu to an incoming caller where the caller can select a product or service to discuss with a contact center agent. The IVR system 123 can also include a metric collector 122. The metric collector 122 in the IVR system 123 collects contact center metrics 129 for the IVR system 123, such as, customer selections, call routing information, customer feedback information (e.g., survey information), and/or the like.

The contact center queue(s) 124 can be any hardware/software that can hold one or more communications for servicing by a contact center resource, such as a contact center agent, a supervisor, the IVR system 123, and/or the like. The held communications can be voice communications, video communication, email communications, text communications, IM communications, and/or the like. The communication may be incoming, current, or outgoing communications. The contact center queue(s) 124 can hold communications based on various criteria, such as a type of product, a type of service, a service level agreement, time of arrival, and/or the like. The contact center queue(s) 124 may further include a metric collector 122. The metric collector 122, in the contact center queue(s) 124, collects contact center metrics 129 associated with the contact center queue(s) 124, such as call wait times, email service times, IM wait times, current communications being held in the contact center queue(s) 124, the number of contact center queues 124, call drops while being queued, and/or the like.

The agent management module 125 can be or may include any hardware/software that manages contact center agents. The agent management module 125 is used by an administrator to define agent skills, agent skill groups, agent schedules, agent break times, agent vacation times, agent assignments, agent contact center queue 124 assignments, agent skills, and/or the like. The agent management module 125 can also include a metric collector 122. The metric collector 122, in the agent management module 125, can collect contact center metrics 129, such as those described above.

The historical database 126 can be or may include any kind of database for storing historical information and/or contact center metrics 129. The historical database 126 can be any type of database, such as a relational database, a hierarchical database, a directory service, a file system, and/or the like. The historical database 126 can store historical information, such as contact center metrics 129, that are collected from the various metric collectors 122. The historical database 126 can include information of various real-time reports 128.

The report manager 127 can be or may include any hardware/software that can manage real-time reports 128. A real-time report is a report that is automatically generated based on the gathering of the real-time metrics. For example, a real-time report may be generated every two (2) seconds or generated based on a change in a metric. Thus, a real-time report may be generated in real-time or in near real-time based on the process used. As discussed herein, a real-time report would cover a report generated in real-time or near-real-time.

In at least some configurations, the specific metrics for a real-time report may be automatically changed (e.g., added or removed) based on different criteria, such as, based on a call volume, based on a time of day, based on a lack of volume, and/or the like. For example, if a call volume reaches a threshold, the number of metrics that are in a report may go from all 10,000 active calls (VDNs) down to 20 calls that have the longest hold time or to 20 calls that are currently on call with an agent for the longest period of time.

A cost function can be defined for the sets of data elements. A cost function is a mathematical formula used to predict a cost associated with a certain action or a certain level of output. The user defines the cost function by setting thresholds defining what is acceptable and unacceptable data element values. A cost function corresponds to data element sets corresponding to a common type of contact center object and/or contact center metric.

The report manager 127 gets the real-time reports 128 from the report generator 132. A real-time report 128 is a grouping of contact center metrics 129 based on various criteria, such as a group of contact center agents, a group of VDNs, a group of agent skills, contact center queue(s) 124 level, a marketing projection, a manufacturing level, a shipping level, an inventory level, IVR responses times, IVR responses, call routing, email levels, text messaging levels, call waiting times, IM waiting time, contact center queue 124 levels, contact center agent input, communications handled per agent, communications handled per contact center agent group, and/or the like. A real-time report 128 can be defined based on input from an administrator. For example, a real-time report 128 may be created by an administrator based different agent skills for a specific product. The real-time reports 128 are separately defined real-time reports 128.

The prediction module 130 can be or may include any hardware/software that can be used to predict how changes to the contact center 120 will affect different real-time reports 128/contact center metrics 129. The prediction module 130 can be used by an administrator to predict and make changes to the contact center groups.

The rendering module 131 can be or may include any hardware/software that can render information for display to a contact center agent/administrator. For example, the rendering module 131 can be a web server that is used by the agent terminals 132/administrative terminal 140. The rendering module 131 can include other elements, such as a video processor, a video card, and/or the like. The rendering module 131 may be distributed between the contact center 120 and the agent terminals 132a-132n/administrative terminal 140. The rendering module 131 can send information that is then displayed at the agent terminals 132a-132n and/or the administrative terminal 140.

The report generator 132 can be or may include any hardware/software that can collect the contact center metrics 129 from the various metric collectors 122. The report generator 132 generates the real-time reports 128 based on the defined groupings or data sets of contact center metrics 129. The real-time reports 128 are then sent to the report manager 127.

The agent terminals 132a-132n can be any communication device that is used by a contact center agent, such as the communication endpoint 101. The agent terminals 132a-132n may comprise multiple devices, such as a telephone and a personal computer. The agent terminals 132a-132n can include any number of agent terminals 132. For example, a large contact center 120 may comprise 10,000 agent terminals 132. The agent terminals 132a-132n are shown directly connected to the contact center 120. However, in some embodiments, the agent terminals 132a-132n are connected to the contact center 120 via a separate network 110, such as a private or corporate network. In some configurations, some or all of the agent terminals 132a-132n may be connected to the network 110.

The administrative terminal 140 can be any communication device used by an administrator to manage the contact center 120, such as the communication endpoint 101. The administrative terminal 140 can comprise a plurality of administrative terminals 140. The administrative terminal 140 is shown as being directly connected to the contact center 120. However, in other embodiments, the administrative terminal 140 may be connected via the network 110 or via a separate network 110.

Figure 2:
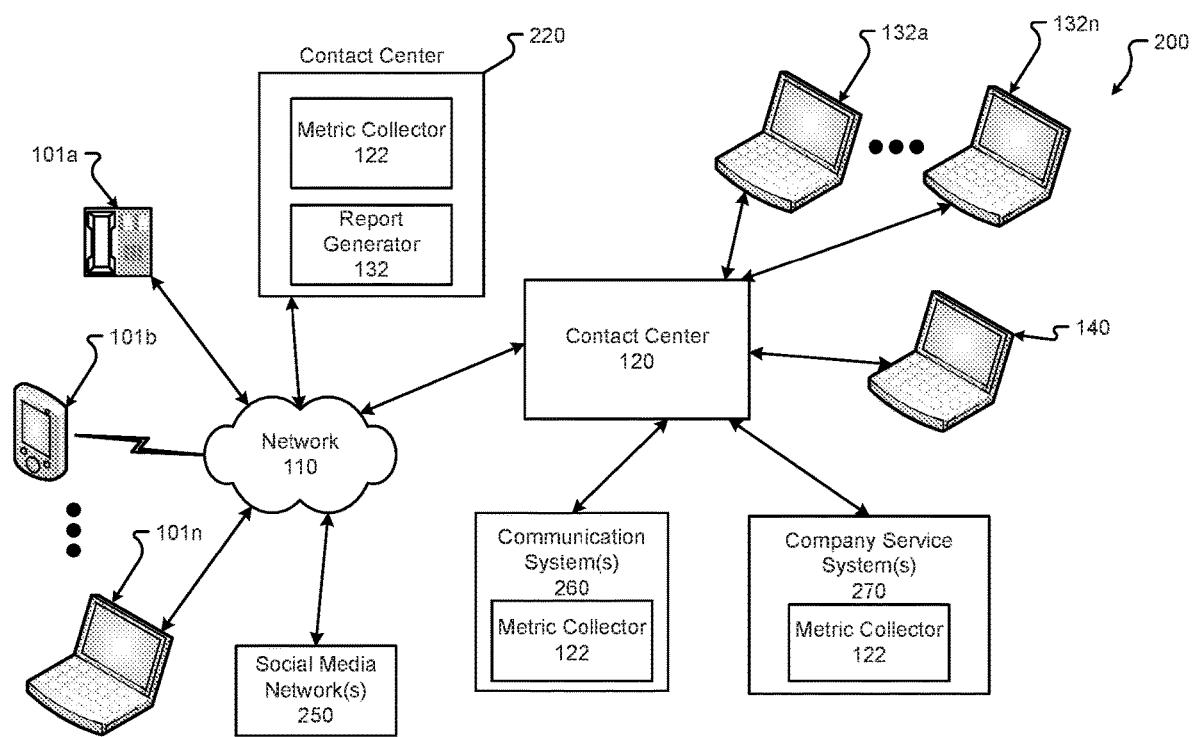
FIG. 2 is another block diagram of an environment including a contact center in accordance with the one or more embodiments presented herein.

FIG. 2 is a block diagram of a second illustrative system 200 for managing contact center metrics 129 from multiple contact centers 120/220. The second illustrative system 200 comprises the communication endpoints 101a-101n, the network 110, the contact center 120, the agent terminals 132a-132n, the administrative terminal 140, a contact center 220, social media network(s) 250, communication system(s) 260, and company service system(s) 270.

The contact center 220 is contact center 220 that is remote to the contact center 120. For example, the contact center 120 may be in the United States and the contact center 220 may be located in India. Although not shown, the contact center 220 may include all or some of some of the elements 121-131 of the contact center 120. The contact center 220 may comprise a plurality of different remote contact centers 220.

The contact center 220 further comprises the metric collector 122 and the report generator 132. The report generator for the contact center 220 collects contact center metrics 129 in a similar manner as the report generator 132 described in FIG. 1. For example, the report generator in the contact center 220 may collect contact center metrics 129, via the metric collector 122, from a communication processor 121, an IVR system 123, contact center queue(s) 124, and/or an agent management module 125 that are in the contact center 220.

Each of the metric collectors 122 may run as separate computer processes, such as separate threads, daemons, or virtual machines. In a multi-tasking system, an individual processor may handle multiple processes, sometimes called a thread or daemon. The multiple threads may be for different applications or for a separate process that provide background processing at specific time intervals. For example, there may be separate threads for each of the metric collectors 122. The threads may be started at periodic time intervals or run continuously. The threads may start asynchronously or synchronously. When started, an individual thread for one or more of the metric collectors 122 may gather metrics 129 to send to the report manager 127. Once the metrics 129 are gathered and sent, the thread may end. This process can then be repeated to gather more metrics 129 based on the time interval.

Alternatively, a thread may be started based on a hardware timer that triggers a hardware interrupt on a microprocessor. In response to receiving the hardware interrupt based on the timer, the processor calls an interrupt service routine that can collect metrics 129 for sending to the report manager 127.

Threads may start based on an event. For example, the metric collector 127 may have a thread that starts upon receipt of a message or packet (e.g., based on a hardware interrupt from a network interface computer chip that triggers a hardware interrupt service routine). When a message is received that indicates to gather metrics 129, the interrupt service routine can gather the metrics 129 and send the metrics to the report manager 127.

In a system that uses multiple processors, or a multi-core processor, one or more of the metric collectors 122 may run on separate processors and/or virtual machines. In this case, messages can be sent between the separate virtual machines to gather the metrics 129 from the metric collectors 129.

The contact center 120 may receive real-time reports 128 from the report generator 132 in the contact center 220. The real-time reports 128 may be all or a subset of the real-time reports 128 that can be defined in the contact center 220. For example, an administrator of the contact center 120/220 may define specific real-time reports 128 that are sent by the report generator 132 in the contact center 220 to the report manager 127 in the contact center 120.

Alternatively, the report generator 132 in the contact center 120 may receive the contact center metrics 129 directly from the metric collector 122 in the contact center 220. The report manager 127 in the contact center 120 may use the contact center metrics 129 collected from the contact center 220 to create one or more real-time reports 128. An individual report may include contact center metrics 129 from the contact center 220 and the contact center 120. For example, a real-time report 128 may include agent skills from the contact center 220 and the same agent skills from the contact center 120.

In one embodiment, the contact center 120 is disparate from the contact center 220. For example, the contact center 120 may be from a different manufacturer than the contact center 220. In this example, the real-time reports 128/contact center metrics 129 received from the report generator 132/metric collector 122 in the contact center 220 may be in different formats and require conversion into a common format by the report manager 127/report generator 132 in the contact center 120.

The social media network(s) 250 can be any type of social network 250 where users post information, converse, and/or the like. For example, the social media network may be Facebook®, LinkedIn®, Twitter®, and/or the like. The report generator 132 in the contact center 120 may actively monitor the social media network(s) 250 to collect contact center metrics 129 for one or more real-time reports 128. For example, the report generator 132 in the contact center 120 may monitor discussions for a particular product or service that the contact center 120/220 may support.

The communication system(s) 260 may be any communication system that is associated with the contact center 120/220. For example, the communication system 260 may be an external ACD system that routes calls to the contact centers 120/220 at different time periods. Another example of a communication system 260 may be an external call parker that parks incoming calls when the contact center 120/220 is overloaded. The report generator 132 in the contact center 120 can use the contact center metrics 129 collected by the metric collector 122 in the communication system(s) 260 to generate one or more real-time reports 128.

The communication system(s) 260 also comprises the metric collector 122. The metric collector 122 collects contact center metrics 129 from the communication system 260 that are then collected by the report generator 128. For example, if the communication system 260 were a call parker, the metric collector 122 in the call parker may collect information on the number of calls that are parked, the time that calls were parked, the types of calls that were parked (e.g., voice/video), and/or the like.

The company service system(s) 270 can be or may include any computer system that manages/processes information for a company/enterprise. For example, the company service system(s) 270 may be a marketing database, a shipping system, an inventory system, a manufacturing system, and/or the like.

The company service system(s) 270 further comprises the metric collector 122. The metric collector 122 in the company service system(s) 270 collects contact center metrics 129 for the report manager 127. The metric collector 122 in the company service system(s) 270 may collect contact center metrics 129 associated with a product that the contact center(s) 120/220 supports. For example, the metric collector in the company service system(s) may collect inventory projections, real-time inventory metrics, real-time shipping information, and/or the like. The report generator 132 in the contact center 120 can use the collected contact center metrics 129 from the company service system(s) 270 to generate one or more real-time reports 128.

Figure 3:
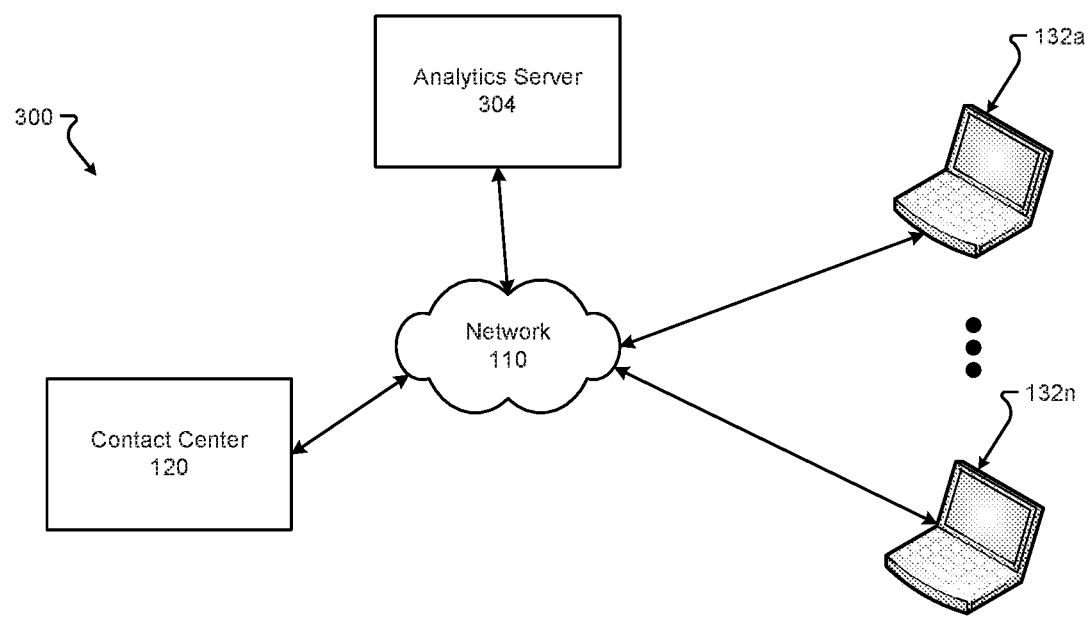
FIG. 3 is another block diagram of an environment including a contact center in accordance with the one or more embodiments presented herein.

Another environment 300, including analytics server 304 which can collect metrics from agent desktops 131, may be as shown in FIG. 3. The environment 300 can include the contact or call center 120 and one or more agent desktops 132. The call center 120 and agent desktops 132 may be in communication through a network 110, as described in conjunction with FIGS. 1 and 2. Further, the environment 300 can include an analytics server 304. The analytics server 304 can be any type of computing system, hardware, and/or software, as described herein. The analytics server 304 can be in communication with both the agent desktops 132 and the contact center 120. The analytics server 304 can receive analytic information about and from the agent desktops 132 and generate a report that may be communicated to the call center 120. An embodiment of the analytics server may be as shown in FIG. 4B. To communicate with the analytics server 304, changes are made both to the call center 120, as described in conjunction with FIG. 5, and to the agent desktop 132, as described in conjunction with FIG. 4A.

Figure 4A:
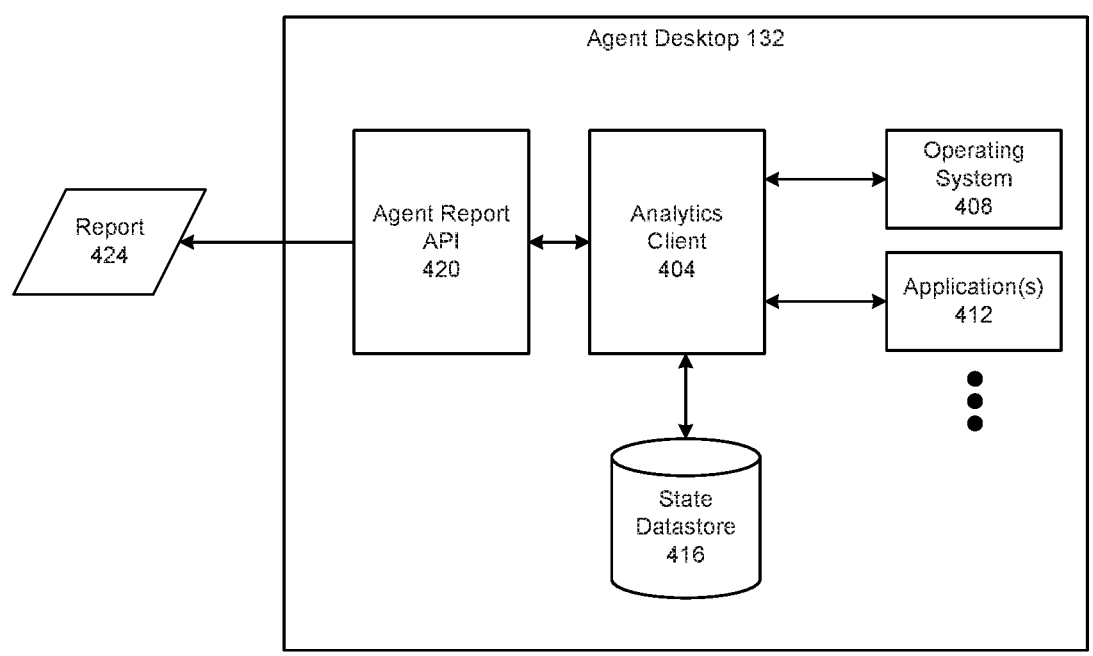
FIG. 4A is a is a block diagram of a configuration of an agent desktop in accordance with the one or more embodiments presented herein.
Figure 4B:
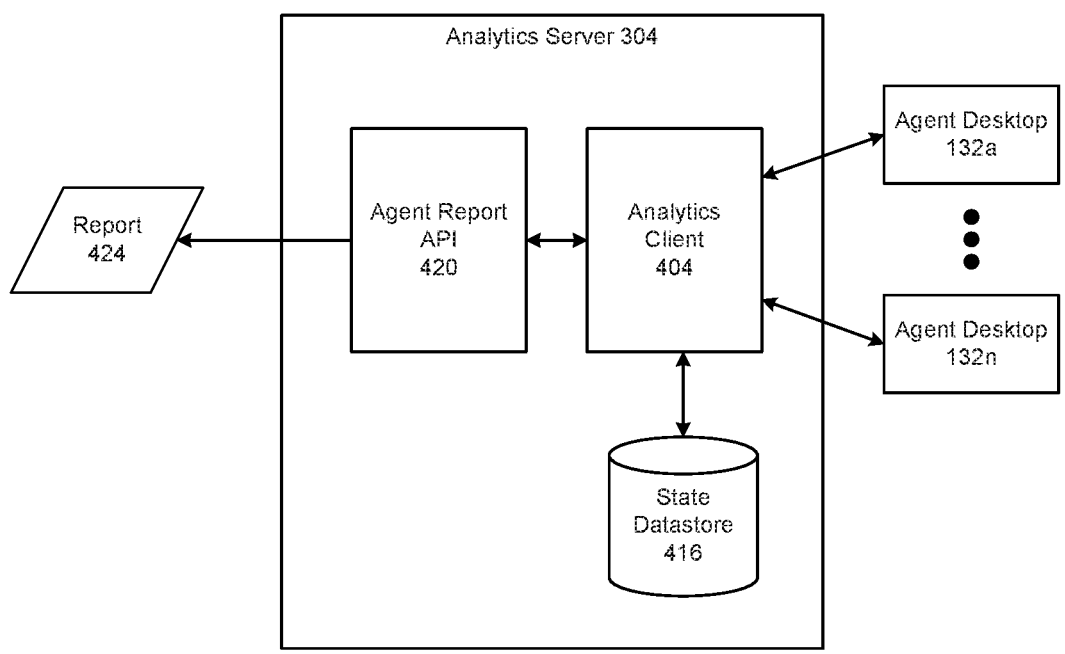
FIG. 4B is a is a block diagram of a configuration of an analytics server in accordance with the one or more embodiments presented herein.

A configuration of the agent desktop 132 may be as described or shown in FIG. 4A. The agent desktop 132 may be any type of computing system as described herein and can execute an analytics client 404, and an agent report application programming interface (API). Thus, the analytics client 404 can be hardware and/or software operating on the agent desktop 132 to collect information about the agent desktop 132. The analytics client 404 may be in communication with an operating system 408, one or more applications 412, and/or other programs or data stored or being managed by the agent desktop 132. The information collected by and/or provided to the analytics client 404 can describe the state of the agent desktop 132.

The analytics client 404 then may store the state of the agent desktop 132 in the state data store 416. The state data store 416 can be any type of datastore or database, for example, an object-oriented database, a flat file system, a directory system, a relation database, etc. The state data store 416 can include any kind of information that describes the agent desktop 132 as described in conjunction with FIG. 6. When required, the analytics client 404 can retrieve state data from the state data store 416 and provide that information to an agent analytics report API 420.

The agent report API 420 can formulate or change the data provided by the analytics client 404 from a format readable and usable by the agent desktop 132 into another format that can be provided either to the analytics server 304 or the call center 120. The information can be provided in a report 424 that may be sent to the analytics server 304 or the call center 120 periodically, continually, etc.

The report 424 may be pulled by the analytics server 304 or call center 120 by providing a request from the analytics server 304 or call center 120 to the agent report API 420. In response to this call, the agent report API 420 may formulate the report 424 and communicate that report to the analytics server 304 or call center 120. In other configurations, the agent report API 420 may push the report 424 to the analytics server 304 or call center 120 based on the lapse of a time period or based on a change to the state of the agent desktop 132 as determined, triggered, and/or signaled by the analytics client 404.

A configuration of the analytics server 304 may be as shown in FIG. 4B. The analytics server 304 can be any hardware and/or software to conduct operations as described herein. The analytics server 304 can include one or more similar components as the agent desktop 132, as described in conjunction with FIG. 4A. Thus, the analytics server 304 can also include an analytics client 404 executing on a computing system and in communication with one or more agent desktops 132. The analytics client 404 can receive information from the agent desktops 132 and store that information in state datastore 416. The state database 416 can include states for more than one agent desktop 132.

The analytics server 304 can provide information for two or more different agent desktops 132 to the call center 120. Therefore, the analytics client 404 can similarly retrieve state data from the state database 416 and provide that information to an agent report API 420. The agent report API can also formulate the report 424. However, with the analytics server 304, the report 424 can include state data for two or more agent desktops 132 provided to the call center 120. Therefore, the analytics server 304 can act as a clearinghouse or consolidator for analytic data from two or more agent desktops 132 and provide a more condensed report to the call center 120. This report 424 from the analytics server 304 can similarly be provided periodically and continually. The report 424 can be pushed from the analytics server 304 or can be sent in response to a call or request from the call center 120.

Figure 5:
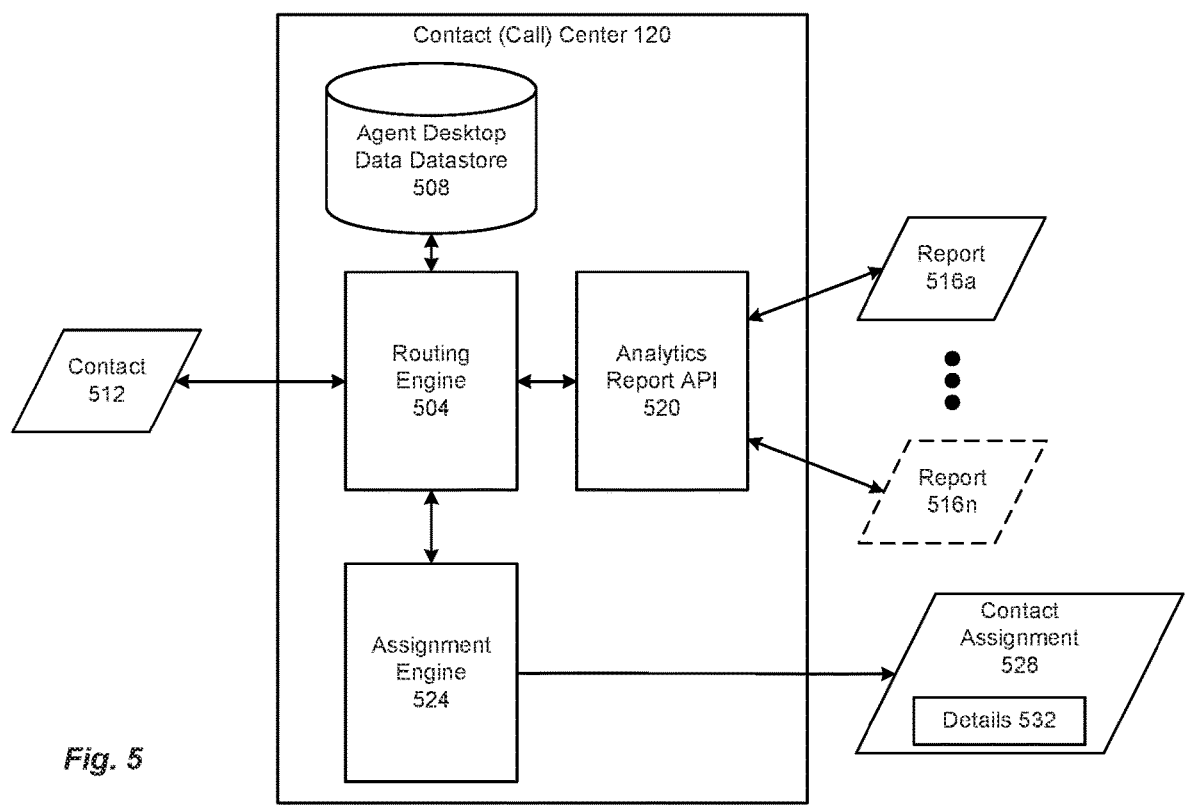
FIG. 5 is a is a block diagram of a configuration of a contact center in accordance with the one or more embodiments presented herein.

An additional or alternative configuration of the call center 120 may be as shown in FIG. 5. The call center 120 can include a routing engine 504, which, in some configurations, may be part of component 124 or other component of the call center 120, as described previously. The routing engine 504 can receive information about desktop analytics through an analytic API 520. The analytic API 520 can receive the analytics report(s) 516a-516n, which may be generated by the agent desktop 132 or the analytics server 304. The analytics report 516 can be the same or similar to report 424, provided by agent desktop 132 and/or analytics server 304. The API 520 can convert the analytics report 516 into data that is in a format or form usable and understandable by the routing engine 504. The API 520 can also receive several reports 516a-516n because each agent desktop 132 may provide a report 516 and thus may send several reports 516 simultaneously or concurrently. In other configurations, the analytics server 304 can send a single consolidated report 516 to the API 520 with information about two or more of the agent desktops 132.

The routing engine 504 may then store the desktop analytic data in the agent desktop data store 508. The agent desktop data store 508 can be any type of datastore or database, for example, an object-oriented database, a flat file system, a directory system, a relation database, etc. The agent desktop data store 508 can include information as described in conjunction with FIG. 6. This information can be arranged or organized based on the agent and provide the state for each of the different agent desktops 132 being directed or instructed by the routing engine 504.

The routing engine 504 can be any type of hardware or software executed on the computing system and may receive contacts 512 through the call center. The contacts 512 can include information about the type of contact and other information as described in conjunction with FIG. 7. This information may be provided to the routing engine 504 to determine what type of agent or which agent should receive the contact 512. The routing engine 504 may match or compare the contact 512 to agent desktop data 508 and provide that information to an assignment engine 524.

The assignment engine 524 can be a component of element 125 or other element as described in conjunction with the call center 120 described in conjunction with FIGS. 1 and/or 2. The assignment engine 524 may be a hardware and/or software component that can assign contacts to different agent desktops 132. The assignment engine 504 can make the comparison based on several metrics or factors for each agent. At least one of those factors may be the analytic data received from the routing engine 504 that is describing the agent desktop environment at the present time. The assignment engine 524 then can create a contact assignment 528, including details 532.

Figure 8:
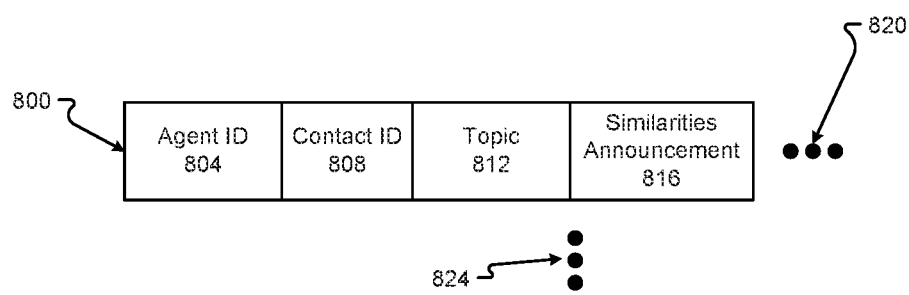
FIG. 8 is a block diagram of a data structure stored, retrieved, and/or managed in accordance with the one or more embodiments presented herein.

The contact assignment 528 can include information as described in conjunction with FIG. 8. The contact assignment 528 may be then sent through the network 100 back to one of the agent desktops 132 to respond to the contact. This contact assignment 528 may provide the details 532 to allow the agent desktop 132 to more efficiently respond to the contact 512. The contact assignment 528 may be provided by the assignment engine 524 based at least in part on the desktop analytics.

Figure 6:
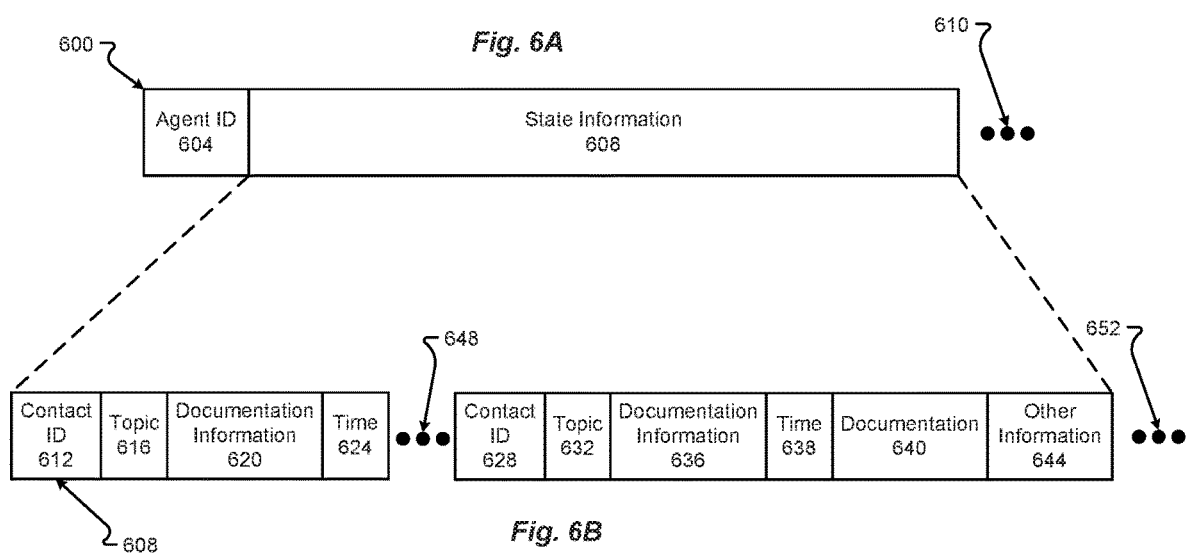
FIG. 6A is a block diagram of a data structure stored, retrieved, and/or managed in accordance with the one or more embodiments presented herein.
FIG. 6B is a block diagram of a data structure stored, retrieved, and/or managed in accordance with the one or more embodiments presented herein.

A data structure 600 that includes information collected and/or stored by the analytics client 404 in the datastore 416 and provided to the call center 102, as an analytics report 424/516 may be as shown in FIG. 6. The data structure 600 can include one or more data elements including an agent identifier (ID) 604 and state information 608. There may be more or fewer data elements than those shown in FIG. 6, as represented by ellipses 610.

The agent ID 604 can include any type of identifier that identifies the agent desktop 132. This agent ID 604 can be a numeric, alphanumeric, globally unique identifier (GUID), or other type of identifier. Regardless of the type of identifier, the agent ID 604 can uniquely identify the agent desktop 132 from other agent desktops executing in the environment 300. Each of the one or more agent desktops 132 can have a unique agent ID 604, and the agent ID 604 can also include a temporal component associated with the agent desktop 132. In other words, the agent ID 604 can identify a time at which the state information was collected from that specific agent desktop 132. This temporal component can include a date and/or time timestamp that provides a more exact determination of the date and/or time at which the state information was collected.

State information 608 can include any information that describes the different operating parameters or characteristics of the agent desktop 132. State information 608 can include any applications, documents, or other resources being accessed and/or executed by the processor of the agent desktop 132 or can include any kind of information describing what is being stored in memory or other operating conditions. Examples of the state information 608 may be as shown in FIG. 6B.

The state information 608 can include one or more of, but is not limited to, a contact identifier (ID) 612, a topic 616, documents information 620, a time 624, or other data or metadata 644. The agent desktop 132 can be addressing one or more different contacts and each contact can have associated information 612, 616, 620, and 624 stored for each of the different contacts. Thus, a second contact, being responded to on the agent desktop 132, can include a second contact identifier 628, a second topic 632, a second documents information 636, a second time 638, etc. There may be more or fewer different contacts being handled by the agent desktop 132, each with a different set of data 612/628, 616/632, 620, 636, 624/638, as represented by ellipses 648.

There may also be further documentation 640 being opened or used by the agent desktop 132 that is not necessarily associated with a contact being responded to at that particular time. There may be more or fewer data elements in the state information 608 or within the contact information (e.g., 612, 620, 624, etc.), as represented by ellipses 652.

The contact ID 612, 628 can be any type of identifier including a numeric identifier, an alphanumeric identifier, a GUID, etc. The contact identifier 612, 628 uniquely identifies the contact assigned to the agent desktop 132. As such, for each contact, a new contact ID 612, 628 is created and provided to the agent desktop 132. This contact information 612, 628 may also be provided back to the call center 120 with other information associated with that particular contact ID 612, 628.

The topic 616, 632 can be the information either provided by the call center 120 to the agent desktop 132 or other information further generated and/or stored with the different contact. This topic 616, 632 can include any information that describes what the contact is regarding or addressing. For example, the topic 616, 632 can include a service call about a part for a refrigerator, can be a customer complaint about a service or individual within an organization, can be a request for information about a product, can be a request to purchase a product, etc. This topic information 616, 632 can include and store the various details about what the contact is about.

Documents information 620, 636 can be any information about what information has been opened or is being used by the agent desktop 132 to respond to the contact. For example, if the contact is about a service call on a part, the documents information 620, 636 can include the parts manuals, the repair manuals, or the other types of information used to answer questions about the part or product associated with the topic 616, 632. There may be one or more different documents open and information about the one or more documents may be provided in the documents field 620, 636. The documents field 620, 636 can include titles, other identifiers, or any type of information that can identify the documents, the pages being used by the agent desktop 132, or other information that delineates what kind of information is being used to answer the contact.

The time information 624 can include a date and/or a timestamp for when the contact was provided or answered by the agent desktop 132. Time 624 can also include any type of duration describing a duration of time that the agent has been addressing the contact, for example, how long the agent has been responding to the contact on the agent desktop 132. The time 624 can also include an end time indicating a time when the contact has ended. The time information 624 can be stored such that a temporal relationship between a new contact and a previous or existing contact, with a similar topic, can be established. Thus, with the time information 624, new contacts can be sent to the agent when the topic is still in the mind of the agent using the agent desktop 132.

Documents 640 can be other documents or information being used by the agent on the agent desktop 132. As such, documents 640 can include similar information to documents information 620, 636 but not necessarily associated with a contact.

Other metadata or data 644 can be any information regarding the agent desktop 132 that may be pertinent to routing a new contact 512 to the agent desktop 132. This other information 644 can include the number of contacts being handled, the similarity of those contacts being handled, the number of windows or screens currently being used (thus providing an indication of a possible confusion level of the agent), or other information that describes the current environment of the agent desktop 132.

Figure 7:
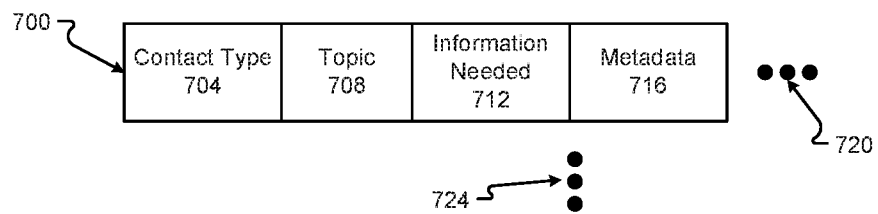
FIG. 7 is a block diagram of a data structure stored, retrieved, and/or managed in accordance with the one or more embodiments presented herein.

An embodiment of data that may be included with a contact 512 may be as shown in data structure 700 shown in FIG. 7. The data structure 700 can include contact information. This contact information can include one or more of, but is not limited to, a contact type 704, topic information 708, information needed 712, metadata 716, etc. There may be more or fewer fields in each contact 700, as represented by ellipses 720. Each contact can have a set of data 700. Thus, there may be more data structures 700 than those shown in FIG. 7, as represented by ellipses 724.

A contact type 704 can be an indication of a category or type of the contact. For example, the contact type 704 can include a service call, customer complaint, purchase request, etc. The contact type 704 may have a simple indication of the type provided in the initial screening of the contact for quick determination, by the routing engine 504, of where to send the contact.

The topic 708 can be similar to or the same as the topic 616, 632, as described in conjunction with FIG. 6B. The topic 708 can be a description of what information or what the customer needs to address the contact 512. For example, the topic 708 can describe the part that needs to be serviced, the part or product that needs to be purchased, the person that is subject to a complaint, etc. The topic information 708 may further delineate the contact beyond the contact type 704 and allow for quicker routing by the routing engine 504.

The information needed 712 can be an indication based on previous contacts or based on initial assessment of what information will be needed to address the topic 708. This information needed 712 can include, for example, which documents may be needed or referenced by an agent or what knowledge may be needed by an agent. This information needed 712 can be associated with what type of information may be open or available on an agent desktop 132, such as the documents information 620, 636, 240, as described in conjunction with FIG. 6B. The routing engine 504 can associate the information needed 712 with the information already accessed or available on the agent desktop 132.

Metadata 716 can include any other data about the contact, including the time the contact was received, the duration of a complaint or request by a customer, the origin of the contact, or other such information. This metadata 716 can further indicate what type of agent desktop environment would be conducive to responding to the contact.

An embodiment of a contact assignment data structure 800, which may be associated or similar to contact assignment 528, may be as shown in FIG. 8. The contact assignment 800 can include one or more of, but is not limited to, an agent identifier (ID) 804, contact identifier (ID) 808, a topic 812, a similarities announcement 816, etc. There may be more or fewer data elements, within data structure 800, as represented by ellipses 820. Each contact assignment can have a different and separate data structure, and thus, there may be more data structure 800 than those shown in FIG. 8, as represented by ellipses 824.

The agent ID 804 can be the same or similar to agent ID 604. In this way, the agent ID 804 can include any type of numeric, alphanumeric, GUID, or other type of identifier that uniquely identifies the agent or agent desktop 132 being sent the contact assignment 800.

The contact ID 808 can be the same or similar to the contact ID 612, and thus, the contact ID 808 can uniquely identify the contact from other contacts within the call center environment 300. This contact ID 808 can be a numeric, alphanumeric, GUID, or other type of ID.

The topic field 812 can be the same as or similar to topic field 708 and/or topic 616, 632. The topic 812 may be derived from the topic 708 and include any information about what is needed from the customer or person sending the contact 512. The topic 812 may be a portion of the topic 616, 632, and thus, the topic 812 may be an initial indication of the topic which may be further elaborated upon by the agent and then stored in topic field 616, 632.

Similarities announcement 816 may be any indication to the agent, using the agent desktop 132, of what information, as provided in the state information 608, that may be similar to the information needed 712. This similarity announcement 816 can provide the agent with the ability to easily locate or determine what information currently on the agent desktop 132 needs to be kept or open to address the topic in the contact assignment 800. The similarities announcement 816 may be as described in conjunction with FIG. 9B or may be other types of indications or announcements that associate the documents information 620, 636, 240 or other information 644 with the information needed 712.

Figure 9A:
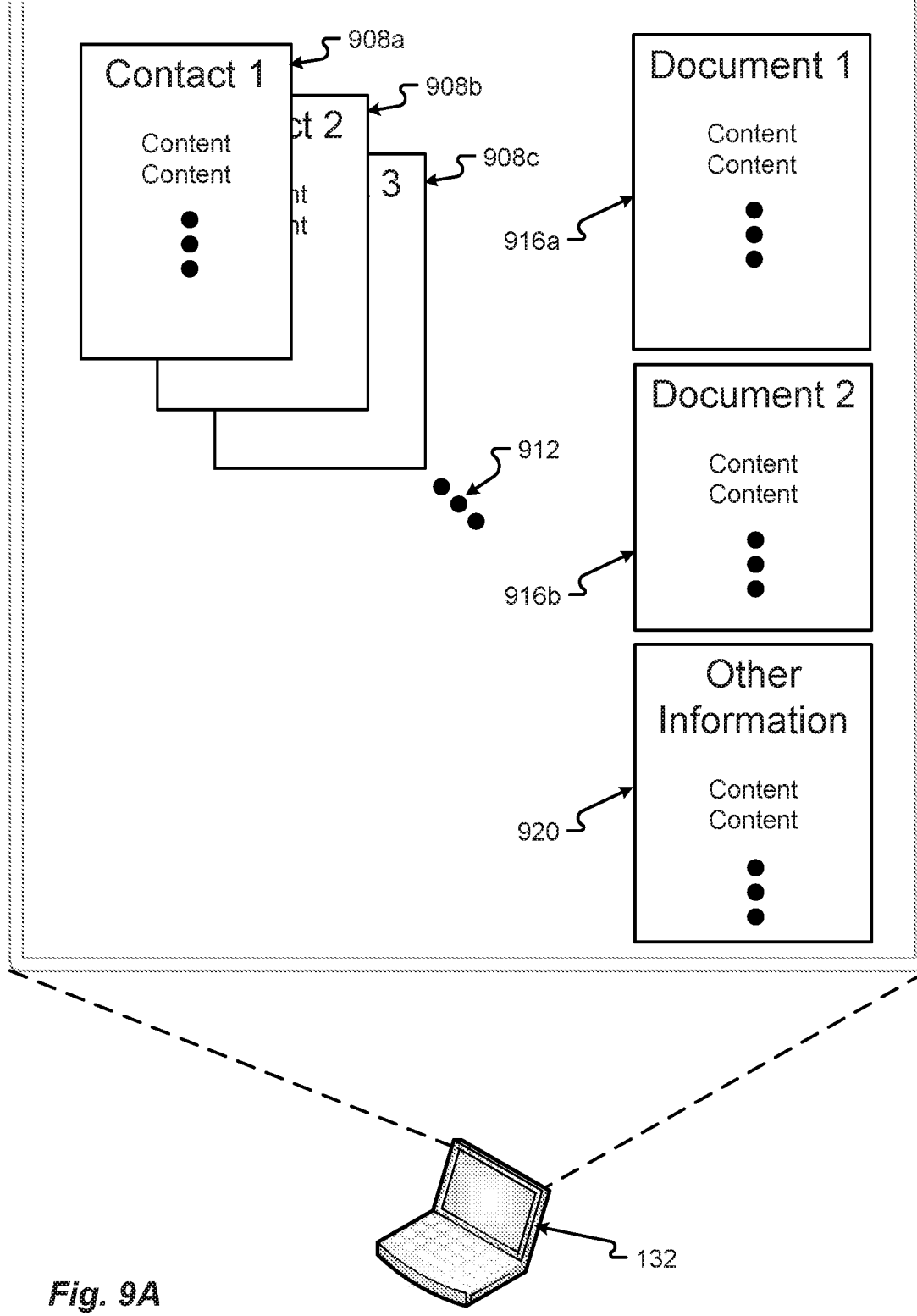
FIG. 9A is a visual representation of a user interface presented by an agent desktop in accordance with the one or more embodiments presented herein.

An embodiment of a user interface 900 that may be presented on an agent desktop 132 may be as shown in FIG. 9A. The user interface 900 can include a window or windows provided in a desktop environment on the agent desktop 132. The user interface 900 thus may be provided as an output from a computing system associated with the agent desktop 132.

The user interface 900 can include one or more visual representations of contacts 908A, 908B, 908C. There may be more or fewer contacts being handled or addressed by the agent, on the agent desktop 132, as represented by ellipses 912. Each contact window 908 can include contact information such as the customer or person being contacted, a dialogue between that person and the agent, or other information.

Further, the user interface 900 can include other information used to address the contacts 908. This information can include, for example, documents 916a and 916b. For example, the documents 916 can include user manuals, parts manuals, repair manuals, or other such information.

The user interface 900 can also include other information 920, such as an Internet search engine, information on availability of parts or other things as provided from an inventory system, or other information that may be required for the agent to respond to one of the contacts 908. The information shown in user interface 900 may be part of the information provided as analytic data from the agent desktop 132, in report 424, to the analytics server 304 or the contact center 120. Further, this information about the user interface 900 can also be provided in analytics report 516 provided from analytics server 304 to the contact server 120.

Figure 9B:
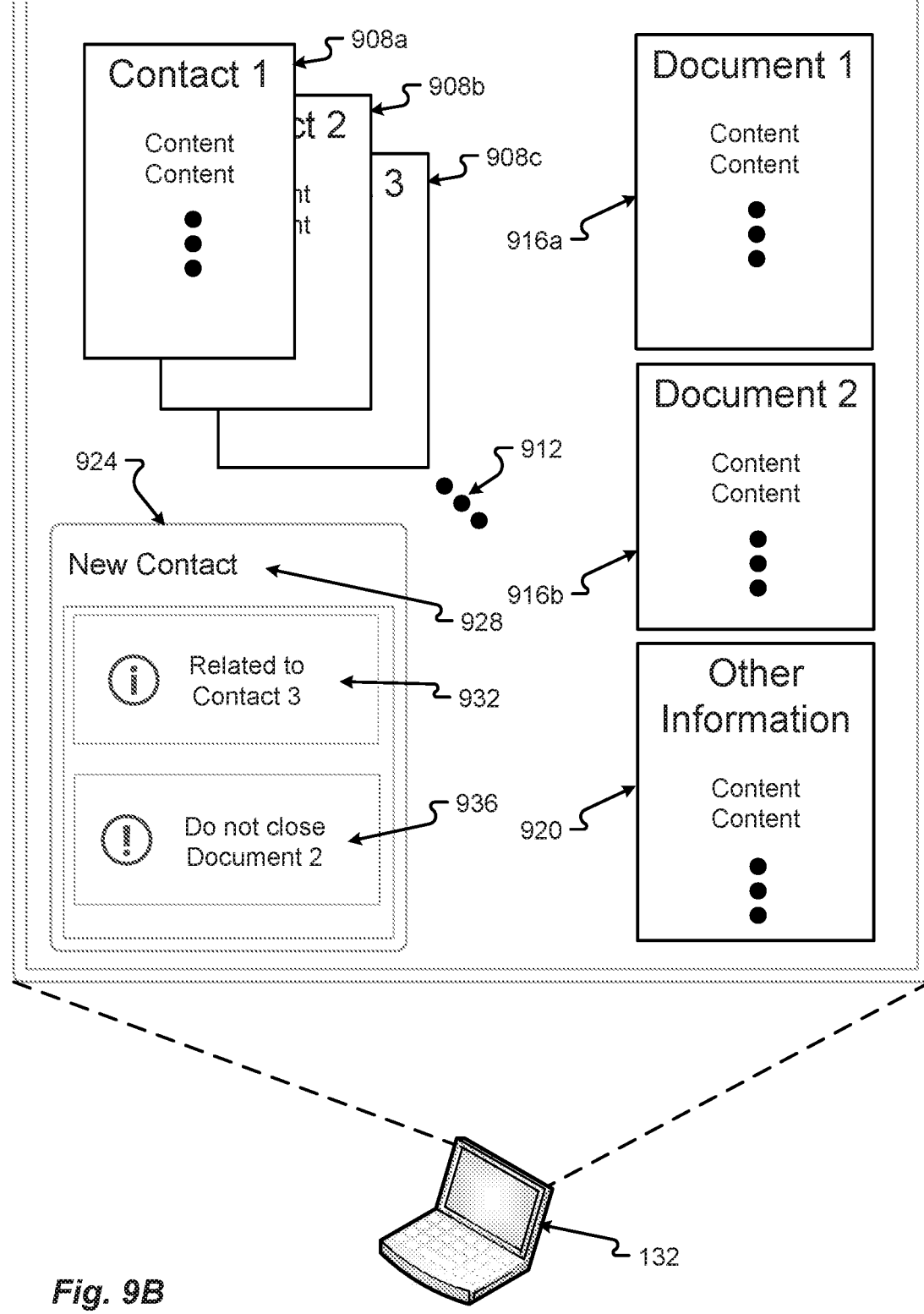
FIG. 9B is a visual representation of another user interface presented by an agent desktop in accordance with the one or more embodiments presented herein.

A further embodiment of the user interface 900 may be as shown in FIG. 9B. In this configuration, the agent desktop 132, may receive a new contact assignment 528. This contact 528 may be represented visually by a new user interface element 924. This user interface element 924 can visually represent the details 532 regarding and/or describing the contact 528. This information 924 can include an identifier 928 that the user interface 924 is a new contact. This identifier 928 can have information that would normally be included in contact ID 612 or contact ID 808. The contact ID 612, and thus information 928, can include the customer's name and information or other such information that might be pertinent to the agent responding to the new contact 528.

Further, the user interface 924 can include information or an indication of how this contact assignment 528 may be related to other contacts being handled or having been handled on the agent desktop 132. For example, information 932 can include information that explains that the new contact, in user interface 924, may be related to contact three (3) in user interface 908C. In this way, the agent can quickly discern which information may be pertinent to this new contact without having to search for the information again.

The contact information 924 can also include an indication of what information already displayed on the user interface 900 should be used for the contact 528. This indication 936, for example, can indicate that the user should not close document two (2) 916b because that document 916b may be used or has been used previously to address similar contacts as the contact 528 represented by user interface 924. This information 936 may be provided from a similarities announcement 816 provided in data structure 800 and sent as details 532 to the agent desktop 132.

Figure 10:
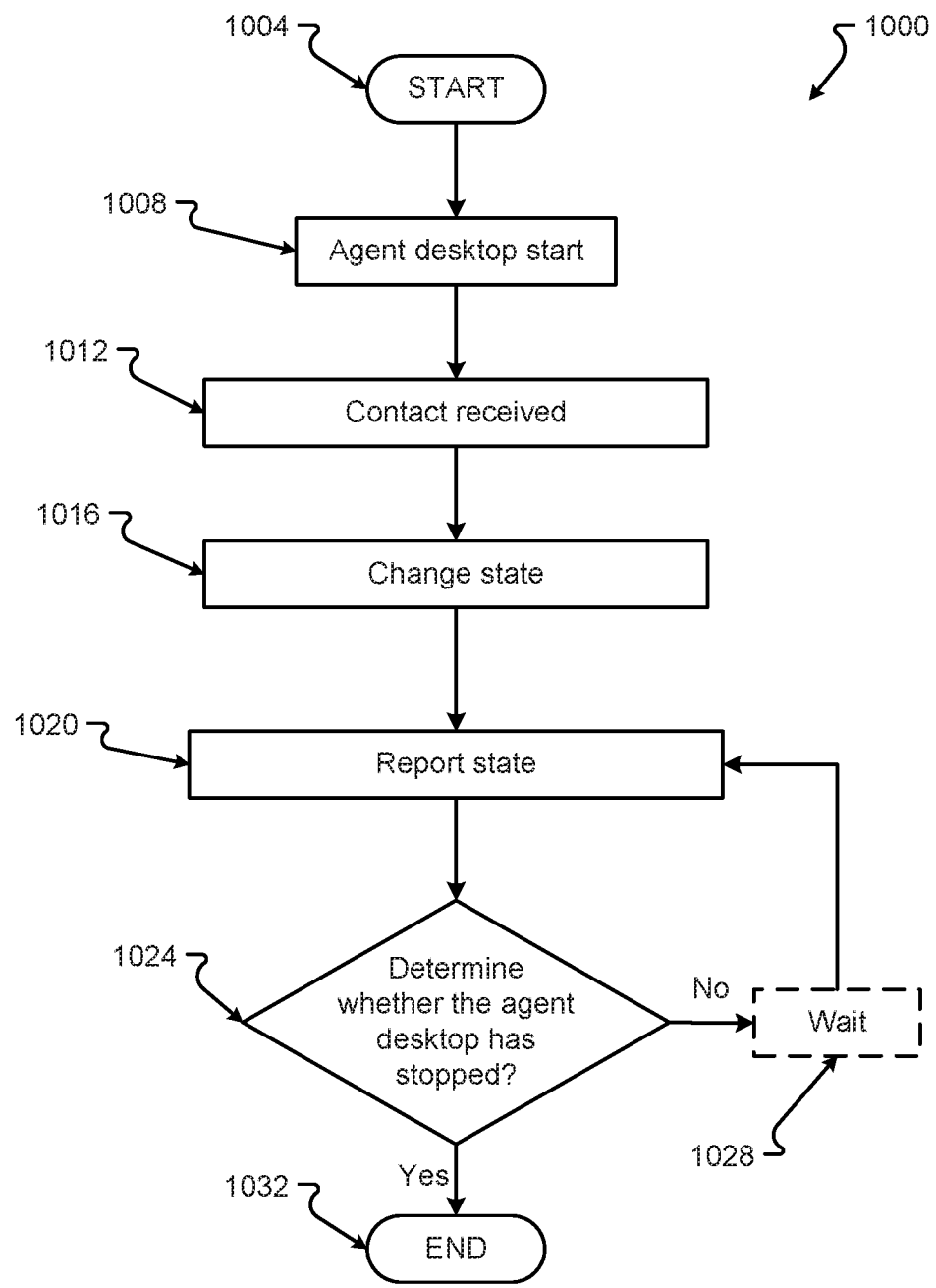
FIG. 10 is a flow diagram of a process for storing state data in accordance with the one or more embodiments presented herein.

An embodiment of a method 1000 for providing state information from an agent desktop 132 to a call center 120 or analytics server 304 or from the analytics server 304 to the contact center 120 may be as shown in FIG. 10. A general order for the steps of the method 1000 is shown in FIG. 10. Generally, the method 1000 starts with a start operation 1004 and ends with operation 1032. The method 1000 can include more or fewer steps or can arrange the order of the steps differently than those shown in FIG. 10. The method 1000 can be executed as a set of computer-executable instructions executed by a computer system or processor and encoded or stored on a computer readable medium. In other configurations, the method 1000 may be executed by a series of components, circuits, gates, etc. created in a hardware device, such as a System of Chip (SOC), Application Specific Integrated Circuit (ASIC), and/or a Field Programmable Gate Array (FPGA). Hereinafter, the method 1000 shall be explained with reference to the systems, components, circuits, modules, software, data structures, signaling processes, models, environments, vehicles, etc. described in conjunction with FIGS. 1-9 and 11 and 12.

The agent may start the agent desktop 132, in step 1008. Here, the agent may begin working on the agent desktop 132 and start up the computing system or any other applications or processes required to respond to contacts. The information describing the initial environment or status of the agent desktop 132 may be recorded in state information 608 and reported to the routing engine 504. Sometime thereinafter, a contact 528 may be received, which will change the state information 608 and require the agent desktop 132 to re-send that state information 608.

The agent desktop 132 can receive a contact, in step 1012. The routing engine 504 may send a contact 512 to the assignment engine 524, which may then send a contact assignment 528 to the agent desktop 132. The contact assignment 528 may appear on the user interface 900 of the agent desktop 132, as new contact information 924. As there may be no documentation or other information open and associated with current state of the user interface 900 or agent desktop 132, the contact information details 532 may not include information 932 or 936, which indicates how this new contact 528 is associated with information already on the agent desktop 132. However, the new contact 528 may then require documentation 916 or other information 920 to be opened or created to respond to the new contact assignment 528.

The opening of the documentation or other information can change the state of the agent desktop 132, in step 1016. With the state change, the analytics client 404 can then record the state information 608 from the OS 408 or applications 412 in state data store 416. This information 608 about the state may include information as described in conjunction with FIGS. 6A and 6B. This information may then be recorded by the analytics client 404 and then provided to the agent report API 420.

The agent report API 420 can then record the state data, from data structure 600, into report 424. Any information from the state information 608 may be recorded into the report 424. The agent report API 420 may then send the report 424 to the analytics server 304 and/or the call center 120, in step 1020. Thereinafter, the analytics server 304 can receive the report 424 with the analytics client 404 executing on the analytics server 304, combine that report 424 with reports 424 from other agent desktops 132, and send a consolidated report 424 back to the call center 120. In other situations, the agent report API 420, in the agent desktop 132, may send the report 424 directly to the call center 120.

The agent may continue to conduct business until the agent stops working at some period thereinafter. Thus, the analytics client 404 can determine whether the agent has stopped working, in step 1024. If the agent has stopped working, the method 1000 proceeds YES to end operation 1032. However, if the agent has not stopped working, the method 1000 may proceed NO to optional wait operation 1028. Optional wait operation 1028 may require the analytics client 404 to wait some period of time before updating the state information 608 in a new report 424. In other configurations, there is no wait operation 1028 but the analytics client 404 periodically or upon change of the state information 608 sends a new report 424. As such, while the agent desktop 132 is being executed, the analytics client 404 continues to report the state of the agent desktop 132, in step 1020.

It should be noted that the analytics server 304 can operate to receive state data, as in step 1016, from one or more agent desktops 132 and report that state data, as in step 1020, and thus, periodically report the state information from two or more agent desktops 132, while any agent desktop 132 is operating. As such, analytics server 304 can conduct some or all of the same steps as the agent desktop 132 as described in conjunction with FIG. 10.

Figure 11:
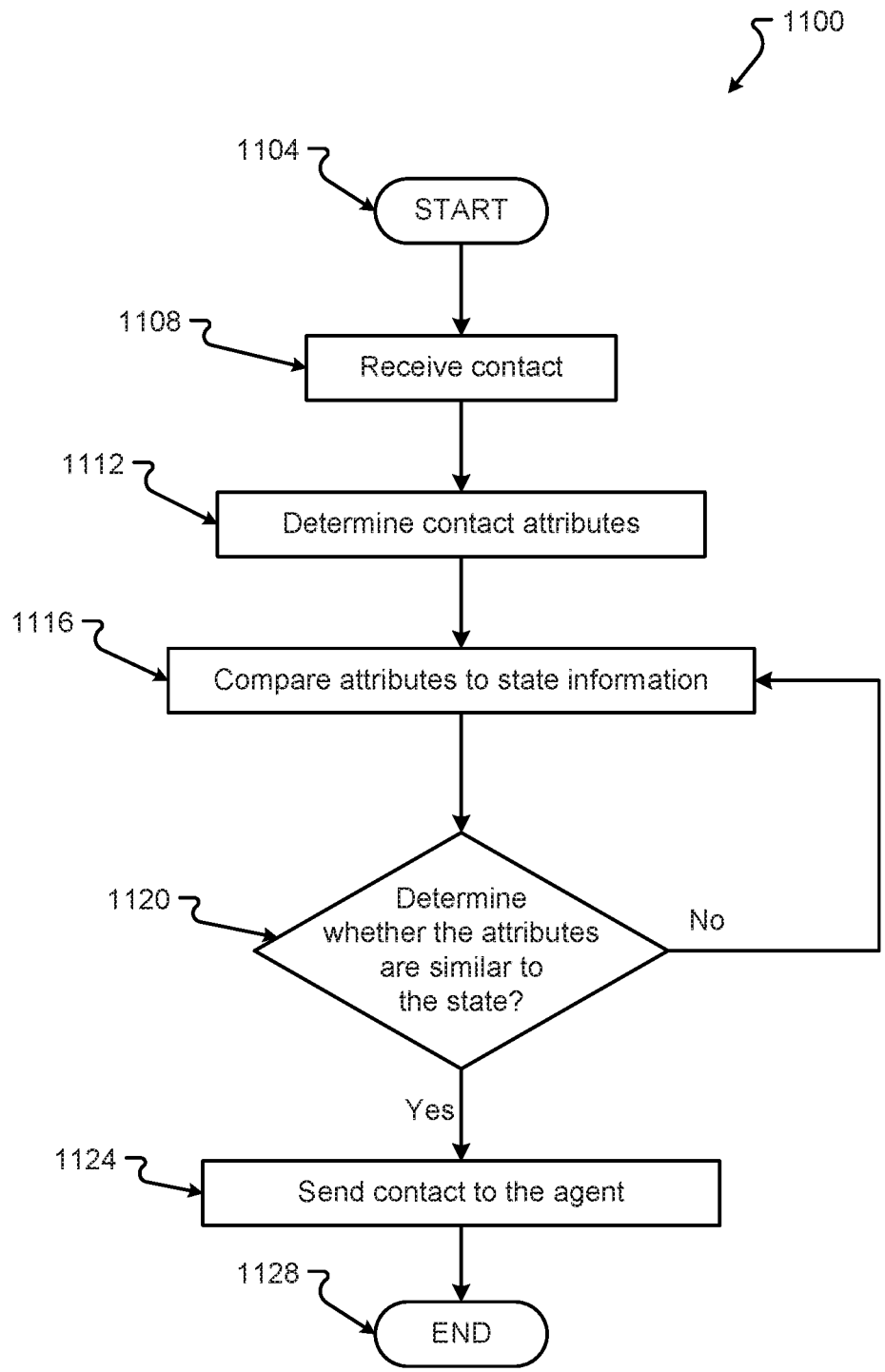
FIG. 11 is a flow diagram of a process for determining a contact assignment in accordance with the one or more embodiments presented herein.

An embodiment of a method 1100 that determines where to send a new contact, based on attributes or state information of agent desktops 132, may be as shown in FIG. 11. A general order for the steps of the method 1100 is shown in FIG. 11. Generally, the method 1100 starts with a start operation 1104 and ends with operation 1128. The method 1100 can include more or fewer steps or can arrange the order of the steps differently than those shown in FIG. 11. The method 1100 can be executed as a set of computer-executable instructions executed by a computer system or processor and encoded or stored on a computer readable medium. In other configurations, the method 1100 may be executed by a series of components, circuits, gates, etc. created in a hardware device, such as a System of Chip (SOC), Application Specific Integrated Circuit (ASIC), and/or a Field Programmable Gate Array (FPGA). Hereinafter, the method 1100 shall be explained with reference to the systems, components, circuits, modules, software, data structures, signaling processes, models, environments, vehicles, etc. described in conjunction with FIGS. 1-10 and 12.

The call center 120 can receive a new contact 512, in step 1108. The new contact 512 can include such information as provided in data structure 700 as described in FIG. 7. This contact information 700 may be sent to the routing engine 504.

The routing engine 504 can determine the attributes of the new contact 512 by retrieving or reading information associated with contact type 704, topic 708, or information needed 712, in step 1112. This retrieved information 704, 708, 712, etc. may then be compared to the information about agent skillset or information about the agent desktop 132 garnered from agent desktop data 508, in step 1116. This comparison can include a comparison of how the contact type 708, topic 708, or information needed 712 may be related to information already opened or executing on the agent desktop 132. For example, the agent desktop 132 may be providing information to a contact with a similar topic 616 using needed documents 620. This correlation between what is already opened or being used on the agent desktop 132 and what is needed by the contact 512 may be useful information provided to the assignment engine 524.

The assignment engine 524 then determines if the attributes of the contact in data structure 700 match the skillset or agent desktop attributes 600 in state information 608, in step 1120. If there is a match and it appears that the most efficient way to respond to the contact 512 is to send it to a certain agent having documents or information already available on the agent desktop 132, the method 1100 proceeds YES to step 1124 to send the contact to the agent. However, if the agent desktop state information 608 is not a match to what is required by the contact, the method 1100 proceeds NO back to step 1116 to compare another skillset or other agent desktop attributes and state information from a different agent desktop 132 to the contact information.

In step 1124, the call center assignment engine 524 may then send the contact assignment 528 to the determined agent desktop 132. The contact assignment 528 can include details which describe the information in data structure 800. This assignment 528 then may be sent over the network 100 to the agent desktop 132, which can receive the new contact 528 as a new user interface 924 in user interface 900.

Figure 12:
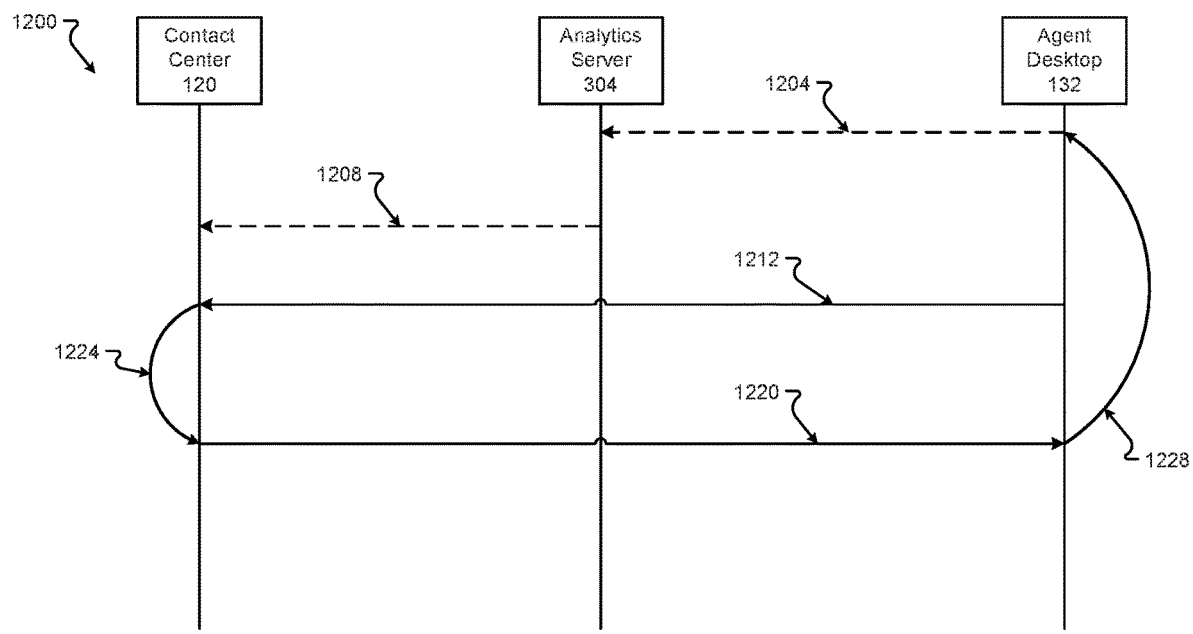
FIG. 12 is a signaling diagram of a process for determining a contact assignment based on state information in accordance with the one or more embodiments presented herein.

An embodiment of a signaling process 1200 may be as shown in FIG. 12. At some point, an agent desktop 132 can send state information 608, in report 424, to the analytics server 304 in optional signal 1204 or to the contact center 120 in signal 1212. Optionally, the analytics server 304 can receive the report 424, consolidate the report 424 with reports from other agent desktops 132, and send the consolidated report 424 to the contact center 120 in optional step 1208.

Upon receiving the state information 608, the contact center 120 can process a new contact and determine to send the new contact to the agent desktop 132 based on the state information in step 1224. Then, the contact center 120 can send the new contact as a contact assignment 528 to the agent desktop 132 in signal 1220. The agent desktop 132 can then respond to the contact assignment 528 and change the state of the agent desktop 132 in response to the contact assignment 528. Then the agent desktop 132 can update the state information 608 to be resent to the contact center 120 in step 1228.

Figure 13:
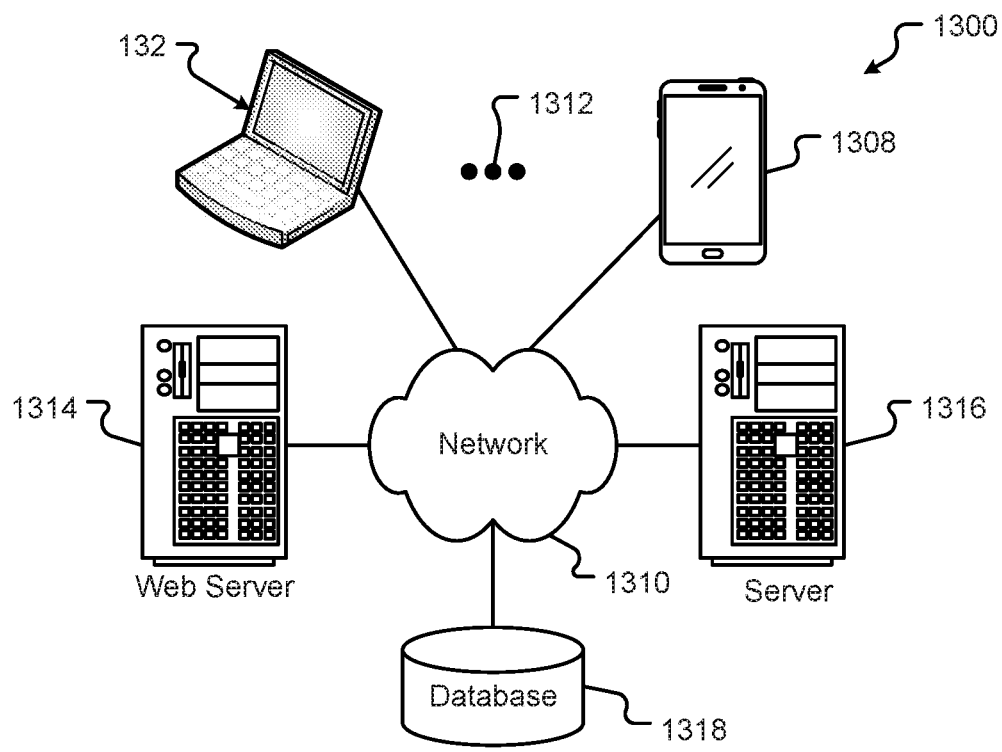
FIG. 13 is a block diagram of a computational environment in accordance with the one or more embodiments presented herein.

FIG. 13 illustrates a block diagram of a computing environment 1300 that may function as the servers, user computers, or other systems provided and described herein. The computing environment 1300 includes one or more user computers, or computing devices, such as an agent desktop 132, a communication device 1308, and/or more 1312. The computing devices 132, 1308, 1312 may include general purpose personal computers (including, merely by way of example, personal computers, and/or laptop computers running various versions of Microsoft Corp.'s Windows® and/or Apple Corp.'s Macintosh® operating systems) and/or workstation computers running any of a variety of commercially-available UNIX® or UNIX-like operating systems. These computing devices 132, 1308, 1312 may also have any of a variety of applications, including for example, database client and/or server applications, and web browser applications. Alternatively, the computing devices 132, 1308, 1312 may be any other electronic device, such as a thin-client computer, Internet-enabled mobile telephone, and/or personal digital assistant, capable of communicating via a network 1310 and/or displaying and navigating web pages or other types of electronic documents or information. Although the exemplary computing environment 1300 is shown with two computing devices, any number of user computers or computing devices may be supported.

The computing environment 1300 may also include one or more servers 1314, 1316. In this example, server 1314 is shown as a web server and server 1316 is shown as an application server. The web server 1314, which may be used to process requests for web pages or other electronic documents from computing devices 132, 1308, 1312. The web server 1314 can be running an operating system including any of those discussed above, as well as any commercially-available server operating systems. The web server 1314 can also run a variety of server applications, including SIP (Session Initiation Protocol) servers, HTTP(s) servers, FTP servers, CGI servers, database servers, Java® servers, and the like. In some instances, the web server 1314 may publish operations available operations as one or more web services.

The computing environment 1300 may also include one or more file and or/application servers 1316, which can, in addition to an operating system, include one or more applications accessible by a client running on one or more of the computing devices 132, 1308, 1312. The server(s) 1316 and/or 1314 may be one or more general purpose computers capable of executing programs or scripts in response to the computing devices 132, 1308, 1312. As one example, the server 1316, 1314 may execute one or more web applications. The web application may be implemented as one or more scripts or programs written in any programming language, such as Java®, C, C#®, or C++, and/or any scripting language, such as Perl, Python, or TCL, as well as combinations of any programming/scripting languages. The application server(s) 1316 may also include database servers, including without limitation those commercially available from Oracle®, Microsoft®, Sybase®, IBM® and the like, which can process requests from database clients running on a computing device 132, 1308, 1312.

The web pages created by the server 1314 and/or 1316 may be forwarded to a computing device 132, 1308, 1312 via a web (file) server 1314, 1316. Similarly, the web server 1314 may be able to receive web page requests, web services invocations, and/or input data from a computing device 132, 1308, 1312 (e.g., a user computer, etc.) and can forward the web page requests and/or input data to the web (application) server 1316. In further embodiments, the server 1316 may function as a file server. Although for ease of description, FIG. 13 illustrates a separate web server 1314 and file/application server 1316, those skilled in the art will recognize that the functions described with respect to servers 1314, 1316 may be performed by a single server and/or a plurality of specialized servers, depending on implementation-specific needs and parameters. The computer systems 132, 1308, 1312, web (file) server 1314 and/or web (application) server 1316 may function as the system, devices, or components described in FIGS. 1-12.

The computing environment 1300 may also include a database 1318. The database 1318 may reside in a variety of locations. By way of example, database 1318 may reside on a storage medium local to (and/or resident in) one or more of the computers 132, 1308, 1312, 1314, 1316. Alternatively, it may be remote from any or all of the computers 132, 1308, 1312, 1314, 1316, and in communication (e.g., via the network 352) with one or more of these. The database 1318 may reside in a storage-area network ("SAN") familiar to those skilled in the art. Similarly, any necessary files for performing the functions attributed to the computers 132, 1308, 1312, 1314, 1316 may be stored locally on the respective computer and/or remotely, as appropriate. The database 1318 may be a relational database, such as Oracle 20i®, that is adapted to store, update, and retrieve data in response to SQL-formatted commands.

Figure 14:
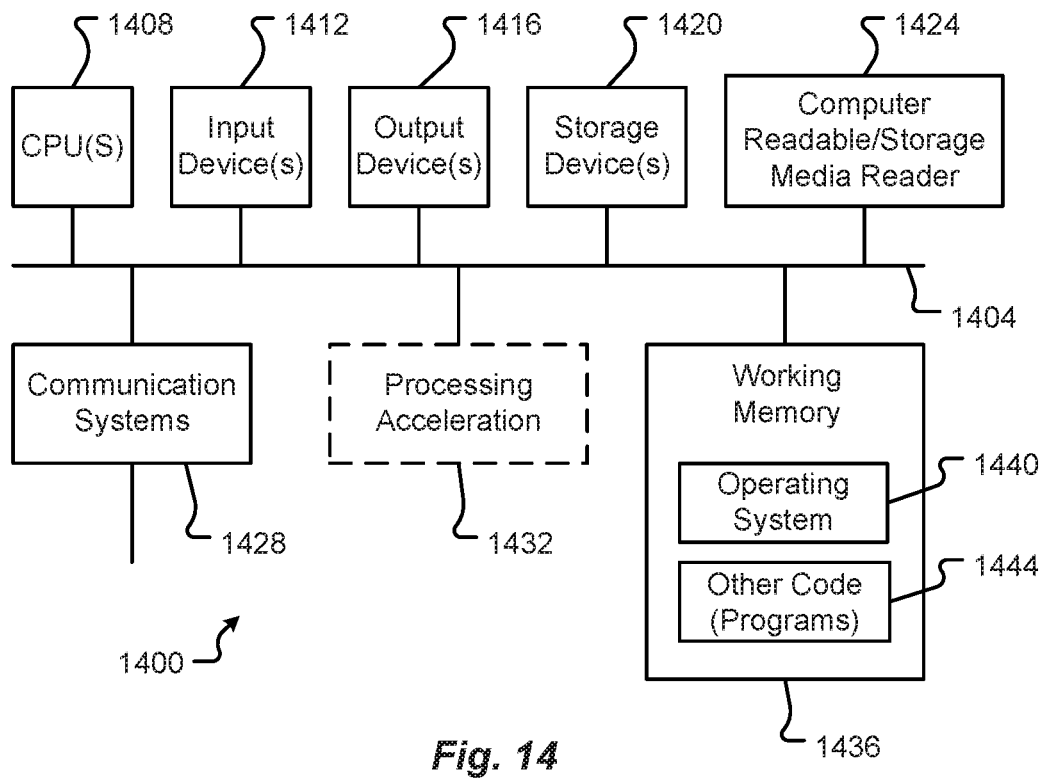
FIG. 14 is a block diagram of a computational system in accordance with the one or more embodiments presented herein.

FIG. 14 illustrates one embodiment of a computer system 1400 upon which the servers, user computers, computing devices, or other systems or components described above may be deployed or executed. The computer system 1400 is shown comprising hardware elements that may be electrically coupled via a bus 1404. The hardware elements may include one or more central processing units (CPUs) 1408; one or more input devices 1412 (e.g., a mouse, a keyboard, etc.); and one or more output devices 1416 (e.g., a display device, a printer, etc.). The computer system 1400 may also include one or more storage devices 1420. By way of example, storage device(s) 1420 may be disk drives, optical storage devices, solid-state storage devices such as a random access memory ("RAM") and/or a read-only memory ("ROM"), which can be programmable, flash-updateable, and/or the like.

The computer system 1400 may additionally include a computer-readable storage media reader 1424; a communications system 1428 (e.g., a modem, a network card (wireless or wired), an infra-red communication device, etc.); and working memory 1436, which may include RAM and ROM devices as described above. The computer system 1400 may also include a processing acceleration unit 1432, which can include a digital signal processor (DSP), a special-purpose processor, and/or the like.

The computer-readable storage media reader 1424 can further be connected to a computer-readable storage medium, together (and, optionally, in combination with storage device(s) 1420) comprehensively representing remote, local, fixed, and/or removable storage devices plus storage media for temporarily and/or more permanently containing computer-readable information. The communications system 1428 may permit data to be exchanged with a network and/or any other computer described above with respect to the computer environments described herein. Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information.

The computer system 1400 may also comprise software elements, shown as being currently located within a working memory 1436, including an operating system 1440 and/or other code 1444. It should be appreciated that alternate embodiments of a computer system 1400 may have numerous variations from that described above. For example, customized hardware might also be used and/or particular elements might be implemented in hardware, software (including portable software, such as applets), or both. Further, connection to other computing devices such as network input/output devices may be employed.

Examples of the processors 1408 as described herein may include, but are not limited to, at least one of Qualcomm® Snapdragon® 800 and 801, Qualcomm® Snapdragon® 620 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™ processors, ARM® Cortex-A and ARM926EJ-S™ processors, other industry-equivalent processors, and may perform computational functions using any known or future-developed standard, instruction set, libraries, and/or architecture.

Embodiments include an agent computing system, comprising: a display; a computer readable medium that stores state information for an agent desktop; a microprocessor, in communication with the user interface and the computer readable medium, the microprocessor to execute the agent desktop, wherein the agent desktop comprises an analytics client, the analytics client to: receive the state information from the microprocessor; store the state information into the computer readable medium; sending the state information; and receiving a contact assignment, wherein the contact assignment is sent to the agent desktop based at least in part on the state information.

Any of the one or more above aspects, wherein the state information comprises information about a contact currently being addressed by the agent desktop.

Any of the one or more above aspects, wherein the information about a contact currently being addressed comprises one or more of a contact identifier, a topic, documentation information, and/or a time.

Any of the one or more above aspects, wherein the state information compromises information about two or more contacts currently being addressed and/or previously addressed by the agent desktop.

Any of the one or more above aspects, wherein the state information further comprises documentation information about a document not associated with a contact currently being addressed and/or previously addressed by the agent desktop, other information, and/or metadata.

Any of the one or more above aspects, wherein the contact assignment includes one or more of a topic and/or a similarities announcement.

Any of the one or more above aspects, wherein at least a portion of information in the similarities assignment is provided in a user interface displayed on the display.

Any of the one or more above aspects, wherein the user interface comprises a first portion that indicates a relation to a second contact currently being addressed by the agent desktop and/or a second portion that indicates what document or information displayed on the agent desktop.

Any of the one or more above aspects, wherein sending the state information comprises sending the state information to an analytics server that consolidates the state information into a report that is sent to the contact center.

Any of the one or more above aspects, further comprising: in response to receiving the contact assignment, receive a second version of the state information, wherein the second version of the state information is different from the state information due to changes necessitated by responding to the contact assignment; storing the second version of the state information into the computer readable medium; and sending the second version of the state information; and Embodiments further include a method, comprising: receiving, by a processor of a contact center, a contact, wherein the contact comprises attributes; receiving, by the processor of the contact center, state information from two or more agent desktops; comparing the attributes to the state information of one or more of the agent desktops; determining if the attributes are similar to the state information; and when the attributes are similar to the state information, sending a contact assignment assigning the contact to the agent desktop in which the attributes are similar to the state information.

Any of the one or more above aspects, wherein the state information comprises information about a contact currently being addressed by the agent desktop.

Any of the one or more above aspects, wherein the information about a contact currently being addressed comprises one or more of a contact identifier, a topic, documentation information, and/or a time.

Any of the one or more above aspects, wherein the state information compromises information about two or more contacts currently being addressed and/or previously addressed by the agent desktop.

Any of the one or more above aspects, wherein the attributes include information about what information is required to address the contact, and wherein the information required is related to information about one or more of the contacts currently being addressed and/or previously addressed by the agent desktop.

Embodiments further include a computer readable medium comprising microprocessor executable instructions that, when executed, cause a microprocessor to: receiving, by a processor of an analytics server, state information from two or more agent desktops; consolidating the state information into a report; and sending the report to a contact center, wherein the contact center generates a contact assignment, wherein the contact assignment is sent to the agent desktop based at least in part on the state information.

Any of the one or more above aspects, wherein the state information comprises information about a contact currently being addressed by the agent desktop, and wherein the information about a contact currently being addressed comprises one or more of a contact identifier, a topic, documentation information, and/or a time.

Any of the one or more above aspects, wherein the state information compromises information about two or more contacts currently being addressed and/or previously addressed by the agent desktop.

Any of the one or more above aspects, wherein the state information further comprises documentation information about a document not associated with a contact currently being addressed and/or previously addressed by the agent desktop, other information, and/or metadata.

Any of the one or more above aspects, wherein the contact assignment includes one or more of a topic and/or a similarities announcement; and wherein at least a portion of information in the similarities assignment is provided in a user interface displayed on the display.

Any one or more of the aspects/embodiments as substantially disclosed herein.

Any one or more of the aspects/embodiments as substantially disclosed herein optionally in combination with any one or more other aspects/embodiments as substantially disclosed herein.

One or means adapted to perform any one or more of the above aspects/embodiments as substantially disclosed herein.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The terms "determine," "calculate," "compute," and variations thereof, as used herein, are used interchangeably and include any type of methodology, process, mathematical operation or technique.

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

Of course, various changes and modifications to the illustrative embodiment described above will be apparent to those skilled in the art. These changes and modifications can be made without departing from the spirit and the scope of the system and method and without diminishing its attendant advantages. The following claims specify the scope of the disclosure. Those skilled in the art will appreciate that the features described above can be combined in various ways to form multiple variations of the disclosure. As a result, the disclosure is not limited to the specific embodiments described above, but only by the following claims and their equivalents.

What is claimed is:

1. A computing system comprising:
one or more processors; and
a non-transitory computer-readable medium storing computer-readable instructions which, when executed by the one or more processors, cause the one or more processors to:
receive state information from an agent computing system via a network connection;
generate a contact assignment by assigning a contact to the agent computing system, wherein the contact assignment is generated based at least in part on the state information received from the agent computing system; and
in response to receiving the state information, transmit the contact assignment to a contact center computing system.

2. The computing system of claim 1, wherein the state information comprises information associated with the contact, wherein the contact is currently being addressed by the agent computing system.

3. The computing system of claim 2, wherein the state information comprises one or more of a contact identifier, a topic, documentation information, and a time.

4. The computing system of claim 1, wherein the state information comprises information about two or more contacts, wherein the two or more contacts are one of currently being addressed by the agent computing system and previously addressed by the agent computing system.

5. The computing system of claim 1, wherein the state information further comprises information about a document.

6. The computing system of claim 1, wherein the contact assignment includes one or more of a topic and a similarities announcement.

7. The computing system of claim 6, wherein the contact assignment includes the similarities announcement, wherein at least a portion of information included in the similarities announcement is transmitted to the agent computing system.

8. The computing system of claim 1, wherein the instructions further cause the one or more processors to:
consolidate the state information into a report; and
transmit the report to the contact center computing system.

9. The computing system of claim 8, wherein the instructions further cause the one or more processors to, in response to transmitting the contact assignment, receive a second version of the state information, wherein the second version of the state information is different from the state information.

10. A computer-implemented method comprising performing operations as follows on one or more processors of a computer system:
receiving state information from an agent computing system via a network connection;
generating a contact assignment by assigning a contact to the agent computing system, wherein the contact assignment is generated based at least in part on the state information received from the agent computing system; and
in response to receiving the state information, transmitting the contact assignment to a contact center computing system.

11. The method of claim 10, wherein the state information comprises information associated with the contact, wherein the contact is currently being addressed by the agent computing system.

12. The method of claim 11, wherein the state information comprises one or more of a contact identifier, a topic, documentation information, and a time.

13. The method of claim 10, wherein the state information comprises information about two or more contacts, wherein the two or more contacts are one of currently being one of addressed and previously addressed by the agent computing system.

14. The method of claim 10, wherein the state information further comprises information about a document.

15. A non-transitory computer-readable storage medium comprising instructions that, when executed by one or more processors, cause the one or more processors to:
receive state information from an agent computing system via a network connection;
generate a contact assignment by assigning a contact to the agent computing system, wherein the contact assignment is generated based at least in part on the state information received from the agent computing system; and
in response to receiving the state information, transmit the contact assignment to a contact center computing system.

16. The computer-readable medium of claim 15, wherein the state information comprises information associated with the contact, wherein the contact is currently being addressed by the agent computing system.

17. The computer-readable medium of claim 15, wherein the state information comprises information about two or more contacts, wherein the two or more contacts are one of currently being addressed by the agent computing system and previously addressed by the agent computing system.

18. The computer-readable medium of claim 15, wherein the state information comprises information about a document.

19. The computer-readable medium of claim 15, wherein the contact assignment includes one or more of a topic and a similarities announcement.

20. The computer-readable medium of claim 19, wherein at least a portion of information in the similarities announcement is transmitted to the agent computing system.

* * * * *